US012231484B2

(12) United States Patent
Ogiwara

(10) Patent No.: US 12,231,484 B2
(45) Date of Patent: Feb. 18, 2025

(54) COMMUNICATION SYSTEM AND GRIPPING SYSTEM

(71) Applicant: Honda Motor Co., Ltd., Tokyo (JP)

(72) Inventor: Shun Ogiwara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 324 days.

(21) Appl. No.: 17/889,333

(22) Filed: Aug. 16, 2022

(65) Prior Publication Data
US 2023/0179648 A1 Jun. 8, 2023

(30) Foreign Application Priority Data

Dec. 6, 2021 (JP) ................................ 2021-197477

(51) Int. Cl.
*H04L 67/025* (2022.01)
*B25J 9/16* (2006.01)

(52) U.S. Cl.
CPC .......... *H04L 67/025* (2013.01); *B25J 9/1612* (2013.01)

(58) Field of Classification Search
None
See application file for complete search history.

(56) References Cited

FOREIGN PATENT DOCUMENTS

| CA | 2950976 A1 | * | 12/2015 | ............ | H04L 67/125 |
| CA | 3228063 A1 | * | 2/2023 | ............ | H04W 24/10 |
| DE | 102005063650 B3 | * | 3/2019 | ............ | G02B 5/1828 |
| JP | H09181754 | | 7/1997 | | |
| JP | H10500814 A | * | 1/1998 | ............... | H04Q 9/14 |
| JP | 2006013599 | | 1/2006 | | |
| JP | 2009515379 | | 4/2009 | | |
| JP | 2020536441 | | 12/2020 | | |
| TW | 201134122 A | * | 10/2011 | ............ | H04B 7/0417 |

OTHER PUBLICATIONS

"Office Action of Japan Counterpart Application", issued on Oct. 8, 2024, with English translation thereof, p. 1-p. 6.

* cited by examiner

*Primary Examiner* — Thomas E Worden
*Assistant Examiner* — Bryant Tang
(74) *Attorney, Agent, or Firm* — JCIPRNET

(57) ABSTRACT

The disclosure provides a communication system and a gripping system. When two or more nodes transmit the frames at the same time, a communication system performs, among the nodes starting transmission at the same time, communication arbitration by stopping transmission except for the node transmitting the frame having a highest priority. The frame ID includes a type ID indicating a type of the node that is a transmission source, a change ID changeable by the node that is the transmission source, and a fixed ID specific to the node that is the transmission source. The type includes a master and slaves. When the type ID is the master, a priority of the frame is set higher than when the type ID is the slave. The master node is capable of transmitting to the bus an instruction signal instructing the slave node to change the change ID.

5 Claims, 7 Drawing Sheets

| | Frame ID | | | | | | | | | |
|---|---|---|---|---|---|---|---|---|---|---|
| Type ID | | Change ID | | | | | Change ID | | | |
| 10 | 9 | 8 | 7 | 6 | 5 | 4 | 3 | 2 | 1 | 0 |
| Master node | 0 | 0 | 0 | 0 | 0 | 0 | 0 | 0 | 0 | 0 |
| Proximal phalanx skin sensor node | 1 | 0 | 0 | 0 | 0 | 0 | 0 | 0 | 0 | 0 | 0 |
| Middle phalanx skin sensor node | 1 | 0 | 0 | 0 | 0 | 0 | 1 | 0 | 0 | 0 | 1 |
| Fingertip skin sensor node | 1 | 0 | 0 | 0 | 0 | 1 | 0 | 0 | 0 | 1 | 0 |

| Type ID | Frame ID | | | | | | | | | | |
|---|---|---|---|---|---|---|---|---|---|---|---|
| | | | | | Change ID | | | Change ID | | | |
| | 10 | 9 | 8 | 7 | 6 | 5 | 4 | 3 | 2 | 1 | 0 |
| Master node | 0 | 0 | 0 | 0 | 0 | 0 | 0 | 0 | 0 | 0 | 0 |
| Proximal phalanx skin sensor node | 1 | 0 | 0 | 0 | 0 | 0 | 0 | 0 | 0 | 0 | 0 |
| Middle phalanx skin sensor node | 1 | 0 | 0 | 0 | 0 | 0 | 1 | 0 | 0 | 0 | 0 |
| Fingertip skin sensor node | 1 | 0 | 0 | 0 | 0 | 1 | 0 | 0 | 0 | 1 | 0 |

COMMUNICATION SYSTEM AND GRIPPING SYSTEM

CROSS-REFERENCE TO RELATED APPLICATION

This application climates the priority benefits of Japanese application no. 2021-197477, filed on Dec. 6, 2021. The entity of the above-mentioned patent application is hereby incorporated by reference herein and made a part of this specialization.

BACKGROUND

Technical Field

The disclosure relates to a communication system including a plurality of nodes connected via a bus, and a gripping system including the communication system and a robot hand.

Related Art

A communication system in which multiple nodes, each configured by a sensor and a processing device, are connected via a bus is widely used. Patent Literature 1 discloses a streaming data network that synchronously transmits control data from a master device to one of multiple slave devices. Further, Patent Literature 2 discloses a system including a data storage server, a service provider server, and a gateway including a transceiver configured to operate at a power level of less than 5.0 mW.

In such a communication system in which multiple nodes are connected, communication arbitration may be performed to give priority to nodes and prevent the transmission data from colliding in case multiple nodes try to transmit transmission data to the bus at the same time.

For example, in the CAN protocol, which is a protocol for communication systems installed in automobiles, to perform communication arbitration, an ID (identifier) indicating the priority of a frame (a unit of transmission data) is included in a beginning part of the frame. This ID is an identifier for identifying content of data set in the succeeding part and a node that is a transmission source, and is set for each frame.

In the CAN protocol, when multiple nodes start data transmission at the same time, the frame with the ID having lower priority fails in arbitration. The node that is the transmission source of the frame fails in the arbitration stops transmission. As a result, among the nodes starting transmission at the same time, the node that is the transmission source of the frame with the highest priority acquires the transmission right and continues to transmit data. Therefore, collision of transmission data is prevented.

CITATION LIST

Patent Literature

[Patent Literature 1] Japanese Patent Application Laid-Open No. 2009-515379
[Patent Literature 2] Japanese Patent Application Laid-Open No. 2020-536441

Problems to be Solved

In the CAN protocol, the priority of frames is set for each node. Therefore, there was a problem that the node to which the transmission data should be prioritized is unchangeable in response to the change in the environment of the communication network.

In view of the above background, an object of the disclosure is to provide a communication system capable of performing communication arbitration based on the priority of frames and in which a node to which transmission data should be prioritized is changeable, and a gripping system including the communication system and a robot hand.

SUMMARY

Means for Solving the Problems

To solve the above problem, one aspect of the disclosure is a communication system (1) including a plurality of nodes (17, 19, 21, 23), each of which connected via a bus (15) and transmitting to the bus a fame including a frame ID that is an identifier, in which priority is set for the frame based on the frame ID, and when two or more of the nodes transmit the frame at the same time, performing, among the nodes starting transmission at the same time, communication arbitration by stopping transmission of the frame except for the node transmitting the frame having a highest priority. The frame ID includes a type ID indicating a type of the node that is a transmission source, a change ID changeable by the node that is the transmission source, and a fixed ID specific to the node that is the transmission source. The type includes a master (23) and slaves (17, 19, 21). When the type ID is the master, a priority of the frame is set higher when the type ID is the slave. The node that is the master is capable of transmitting to the bus an instruction signal instructing the node that is the slave to change the change ID. When the node that is the slave receives the instruction signal, the change ID included in the frame is changed according to the instruction signal.

One aspect of the disclosure is a gripping system, including the communication system of the above aspect and a robot hand capable of gripping an object. Each of the nodes that is the slave is connected to a sensor that acquires information related to contact with a surface of the robot hand. When an object to be gripped of the robot hand is determined and a usage status of the robot hand is changed, the node that is the master transmits the instruction signal to give priority to the frame from the sensor that acquires the information related to the surface predicted to come into contact with the object to be gripped.

BRIEF DESCRIPTION OF THE DRAWINGS

FIG. 3 is an explanatory diagram for illustrating a configuration of a frame.
FIG. 4 is an explanatory diagram for illustrating a configuration of an instruction signal.

DESCRIPTION OF THE EMBODIMENTS

Hereinafter, a communication system and a gripping system according to this embodiment of the disclosure will be described with reference to the drawings.

Figure 1:
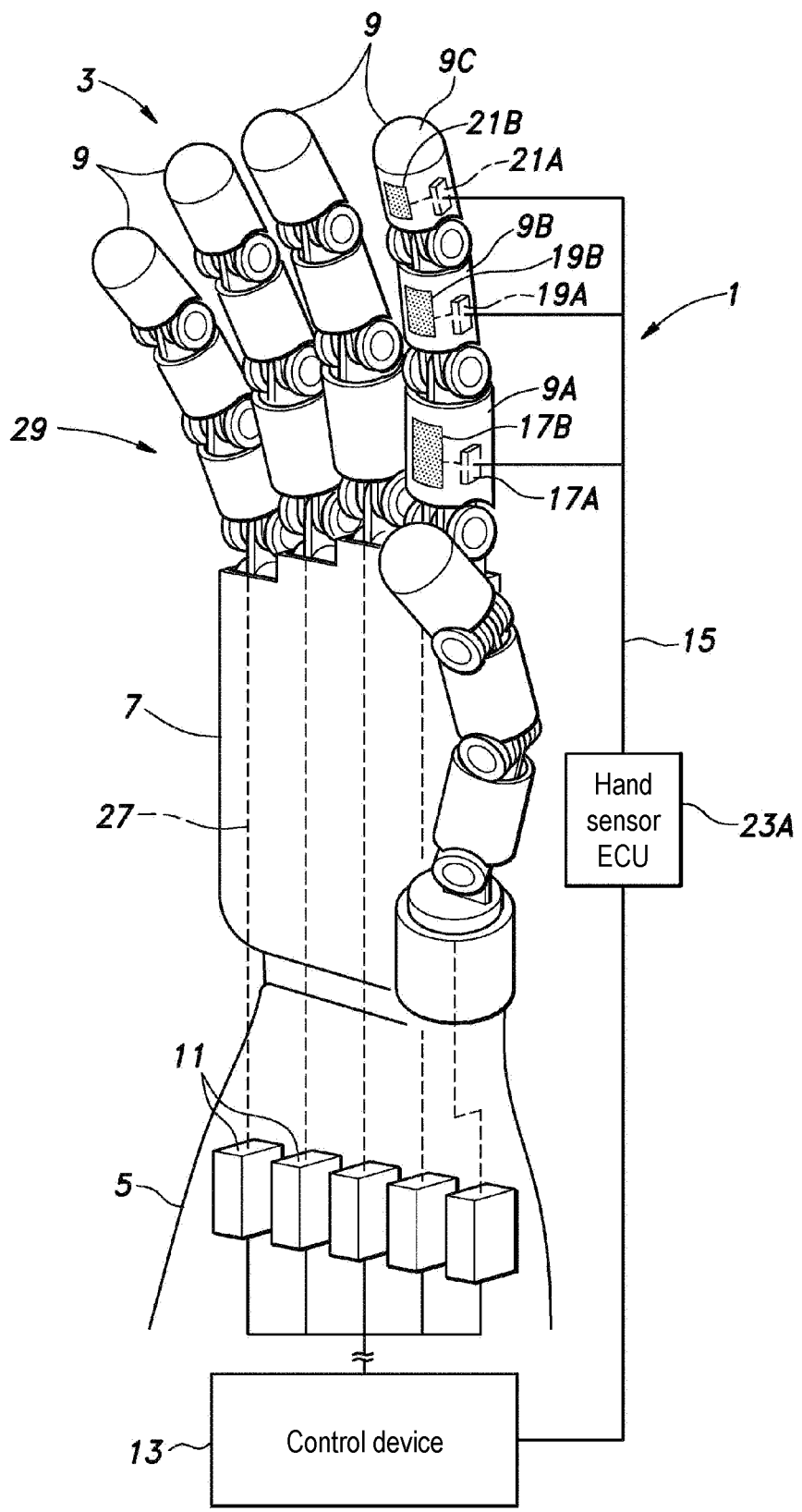
FIG. 1 is a perspective diagram of a robot hand provided with a communication system according to the disclosure.

As shown in FIG. 1, a communication system 1 is provided in a robot hand 3. The robot hand 3 has an arm portion 5 constituting a portion corresponding to a human arm, a palm portion 7 constituting a portion corresponding to a human palm, and a plurality of finger portions 9 that form a portion corresponding to the human fingers. Each of the finger portions 9 includes a first link 9A rotatably connected to the palm portion 7 at a proximal end, a second link 9B rotatably connected to a free end of the first link 9A at a proximal end, and a third link 9C rotatably connected to a free end of the second link 9B at a proximal end. The first link 9A constitutes a portion of the robot hand 3 corresponding to a proximal phalanx of the human finger. The second link 9B constitutes a portion of the robot hand 3 corresponding to a middle phalanx of the human finger. The third link 9C constitutes a portion of the robot hand 3 corresponding to a distal phalanx of the human finger.

The robot hand 3 is provided with a plurality of driving devices 11 for driving the finger portions 9 to bend/extend, respectively, and a control device 13 for controlling the drive of the driving devices 11, respectively.

Figure 2:
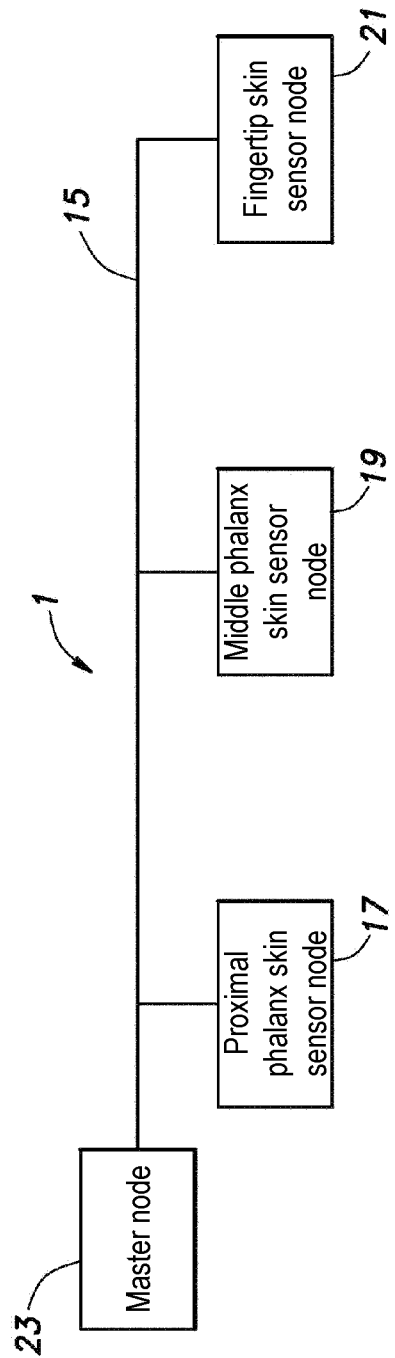
FIG. 2 is a configuration diagram showing a configuration of a communication system according to the disclosure.

As shown in FIG. 2, the communication system 1 includes a plurality of nodes 17, 19, 21, and 23 connected to a bus 15. In this embodiment, the communication system 1 includes four nodes 17, 19, 21, and 23 as shown in FIG. 2, but the disclosure is not limited to the number of nodes.

The communication system 1 includes, as the nodes 17, 19, 21, the slave nodes 17, 19, 21 for acquiring information from various sensors provided in the robot hand 3, and a master node 23 transmitting the information acquired from the slave nodes 17, 19, 21 to the control device 13. In this embodiment, of the four nodes 17, 19, 21, 23, one node is the master node 23, and the other three nodes function as the slave nodes 17, 19, 21.

Each node is an electronic control unit (hereinafter, an ECU) and is composed of a microcomputer. The slave nodes 17, 19 and 21 are composed of by a proximal phalanx skin sensor ECU 17A, a middle phalanx skin sensor ECU 19A, and a fingertip skin sensor ECU 21A, respectively. The master node 23 is composed of a hand sensor ECU 23A (see FIG. 1).

Hereinafter, when necessary, the slave node 17 composed of the proximal phalanx skin sensor ECU 17A, the slave node 19 composed of the middle phalanx skin sensor ECU 19A, and the slave node 21 composed of the fingertip skin sensor ECU 21A are respectively referred to as a proximal phalanx skin sensor node 17, a middle phalanx skin sensor node 19, and a fingertip skin sensor node 21.

As shown in FIG. 1, the proximal phalanx skin sensor ECU 17A is connected to a sensor provided on a surface of a portion corresponding to the proximal phalanx of the finger portion 9 (hereinafter, a proximal phalanx skin sensor 17B). The proximal phalanx skin sensor 17B is provided on the first link 9A, and acquires data such as contact with the portion corresponding to the proximal phalanx of the finger portion 9 and pressure applied to the portion corresponding to the proximal phalanx of the finger portion 9. The proximal phalanx skin sensor ECU 17A may transmit the data acquired by the proximal phalanx skin sensor 17B to the bus 15.

The middle phalanx skin sensor ECU 19A is connected to a sensor provided on a surface of the portion corresponding to the middle phalanx of the finger portion 9 (hereinafter, a middle phalanx skin sensor 19B). The middle phalanx skin sensor 19B is provided on the second link 9B, and acquires data such as contact with the portion corresponding to the middle phalanx of the finger portion 9 and pressure applied to the portion corresponding to the middle phalanx of the finger portion 9. The middle phalanx skin sensor ECU 19A may transmit the data acquired by the middle phalanx skin sensor 19B to the bus 15.

The fingertip skin sensor ECU 21A is connected to a sensor (hereinafter, fingertip skin sensor 21B) provided on a surface of the portion corresponding to the distal phalanx of the finger portion 9. The fingertip skin sensor 21B is provided on the third link 9C, and acquires data such as contact with the portion corresponding to the distal phalanx of the finger portion 9 and pressure applied to the portion corresponding to the distal phalanx of the finger portion 9. The fingertip skin sensor ECU 21A may transmit the data acquired by the fingertip skin sensor 21B to the bus 15.

The hand sensor ECU 23A is provided on the palm portion 7, and is connected to the proximal phalanx skin sensor ECU 17A, the middle phalanx skin sensor ECU 19A, and the fingertip skin sensor ECU 21A via the bus 15 which is wiring. The hand sensor ECU 23A is also connected to the control device 13 via wiring different from the wiring constituting the bus 15.

Each of the driving devices 11 is composed of one or more motors provided on the arm portion 5. The driving force of the driving device 11 is transmitted to the first link 9A, the second link 9B, and the third link 9C of the corresponding finger portion 9 via a power transmission mechanism 27. The driving device 11 may generate a driving force to rotate the first link 9A with respect to the palm portion 7. Further, the driving device 11 may generate a driving force to rotate the second link 9B with respect to the first link 9A. Further, the driving device 11 may generate a driving force to rotate the third link 9C with respect to the second link 9B. As a result, the driving device 11 may bend/extend (bend and stretch) the finger portion 9.

The driving device 11 acquires a rotation angle of each link by totaling the drive amounts of the first link 9A, the second link 9B, and the third link 9C. However, the disclosure is not limited to this aspect. A rotation angle sensor (not shown) for detecting the rotation angle of the links connected to each other between the palm portion 7 and the first link 9A, between the first link 9A and the second link 9B, and between the second link 9B and the third link 9C may be respectively provided, and the driving device 11 may acquire a detection result of the rotation angle sensor. The power transmission mechanism 27 may be composed of a wire, a pulley, or the like, and may have any configuration as long as it may transmit the driving force of the driving device 11 so as to bend and stretch the finger portion 9.

The control device 13 is composed of a computer and is connected to the hand sensor ECU 23A and the driving device 11. The control device 13 may be provided on the arm portion 5, or may be provided on the body portion or the head portion of a robot. The control device 13 sets a drive mode of the robot hand 3, controls the driving device 11, and bends/extends the finger portion 9 so as to match the drive mode. The drive mode includes, for example, a sphere gripping mode for gripping a spherical ball and a disk gripping mode for gripping a disk.

The control device 13 controls the driving device 11 to bend/extend the finger portion 9 so as to match the drive mode, and at the same time, outputs to the hand sensor ECU 23A a signal (hereinafter, drive mode signal) including information related to the drive mode. The hand sensor ECU 23A may send a signal to the proximal phalanx skin sensor ECU 17A, the middle phalanx skin sensor ECU 19A, and the fingertip skin sensor ECU 21A to set a priority, and may acquire a signal transmitted from the proximal phalanx skin sensor ECU 17A, the middle phalanx skin sensor ECU 19A, and the fingertip skin sensor ECU 21A, and output the signal to the control device 13.

Based on the detection results of the proximal phalanx skin sensor ECU 17A, the middle phalanx skin sensor ECU 19A, and the fingertip skin sensor ECU 21A acquired from the hand sensor ECU 23A, the control device 13 controls the driving device 11 to grip an object by the robot hand 3. In this way, the communication system 1, the robot hand 3, the control device 13, and the driving device 11 constitute a gripping system 29 capable of gripping an object.

The master node 23 composed of the hand sensor ECU 23A, and the slave nodes 17, 19 and 21 respectively composed of the proximal phalanx skin sensor ECU 17A, the middle phalanx skin sensor ECU 19A, and the fingertip skin sensor ECU 21A each transmit to the bus 15 a signal for setting a priority and a signal indicating a detection result by the corresponding sensors 17B, 19B, 21B. When the signals transmitted from the master node 23 and the slave nodes 17, 19, and 21 are transmitted at the same timing, a communication arbitration is performed in which the one having high priority is transmitted with priority.

Figure 4:
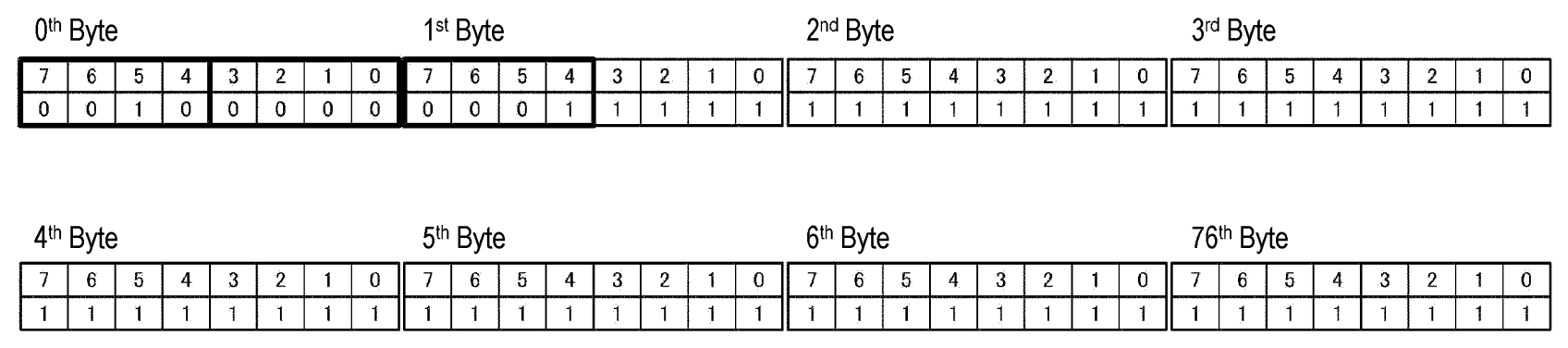

A configuration for performing such communication arbitration will be described with reference to FIGS. 3 to 5.

Nodes 17, 19, 21, and 23 respectively transmit transmission data as a set called a frame.

The frame includes a header area and a data area following the header area. The header area includes a frame ID which is an identifier (ID) of the frame. The frame ID has a specified data length and is binary data in which the data is represented by high level and low level. In this embodiment, the data length of the frame ID is set to a bit length of the standard format used in CAN communication, that is, 11 bits. However, the data length of the form ID is not limited to this embodiment, and may be set to, for example, a bit length of an extended format used in CAN communication, that is, 29 bits. When a high level is logic 1 and a low level is logic 0, the frame ID may be represented by an array of 0 and 1, which may be regarded as a binary number expressed by 0 and 1. Nodes 17, 19, 21, and 23 transmit data to the bus 15 in order from the bit located at the beginning part of the frame.

The bus 15 is configured such that the signal level becomes a low level when a signal of high level and a signal of low level are simultaneously output from the plurality of nodes 17, 19, 21, and 23. Therefore, when frames are transmitted from the plurality of nodes 17, 19, 21, and 23 to the bus 15 at the same time, the frame having a small frame ID (specifically, the binary number corresponding to the frame ID is small) is prioritized. Therefore, the frame ID represents the priority of the frame.

The nodes 17, 19, 21, and 23 each monitor the signal level of the bus 15. When the nodes 17, 19, 21, and 23 transmit a frame to the bus 15, when it is determined that the signal level of the frame transmitted to the bus 15 does not match the signal level of the bus 15, the transmission of the frame is stopped. Each of the nodes 17, 19, 21, and 23 confirms that the signal is not transmitted to the bus 15 (hereafter, "vacant state" or "bus idol"), and transmits the signal to the bus 15 when in such vacant state.

Therefore, when the plurality of nodes 17, 19, 21, and 23 start transmitting frames at the same time, only the nodes 17, 19, 21, and 23 starting the transmission of the frame including the frame ID having the highest priority will continue the transmission. As a result, in the event of a frame collision, the transmission of the frame having the smallest frame ID is prioritized. That is, the priority is set for the frame based on the frame ID, so-called communication arbitration, in which transmission of the frame with the lower priority is stopped, is realized.

FIG. 3 shows an example of a frame ID. The frame ID includes a type ID, a change ID, and a fixed ID.

The type ID is data indicating the type of the node 17, 19, 21, 23 that is the transmission source, and is binary data having a specified data length (1 bit in this embodiment). The type ID is the beginning part of the header area and is recorded in the beginning part of the frame ID. The type ID is set to 0 when the node that is the transmission source is the master node 23, and the type ID is set to 1 when the node that is the transmission source is the slave nodes 17, 19, and 21.

The change ID is data indicating a priority set according to the drive mode, and is binary data having a specified data length (4 bits in this embodiment). The change ID is recorded in the header area in a portion after the type ID.

When the node 17, 19, 21, 23 that is the transmission source is the master node 23, the change ID is fixed to "0000". In this embodiment, the change ID is binary data in which the priority is converted into a binary number among the slave nodes 17, 19, and 21. For example, when the priority is first among the slave nodes 17, 19, and 21, the change ID is set to "0000".

The change ID of the frame transmitted by the slave nodes 17, 19 and 21 is not fixed and is configured to be changeable. To be specific, when an instruction signal instructing the slave nodes 17, 19, 21 to change the change ID is transmitted to the bus 15 by the master node 23 and the slave nodes 17, 19, 21 receive the instruction signal, the slave nodes 17, 19 and 21 change the change ID included in the frame according to the instruction signal. As a result, after the slave nodes 17, 19 and 21 receive the instruction signal, the frame transmitted by the slave nodes 17, 19, 21 will include the change ID changed according to the instruction signal, and the priority of the frame transmitted by the slave nodes 17, 19, 21 will be changed.

In this embodiment, the slave nodes 17, 19 and 21 each set the change ID to "0000" during a period from the start of the driving of the communication system 1 to reception of the instruction signal from the master node 23.

The fixed ID is data indicating an identifier (ID) specific to the node 17, 19, 21, 23 that is the transmission source and is binary data having a specified data length (4 bits in this embodiment). The fixed ID is recorded in the header area in a portion after the change ID.

Since the fixed ID of the frame transmitted by the master node 23 and the slave nodes 17, 19, 21 is unique to the node that is the transmission source, each of the nodes 17, 19, 21, and 23 is given a different fixed ID, which does not change. When the node 17, 19, 21, 23 that is the transmission source is the master node 23, the fixed ID is fixed to "0000". In this embodiment, the fixed ID of the proximal phalanx skin sensor ECU 17A, the fixed ID of the middle phalanx skin sensor ECU 19A, and the fixed ID of the fingertip skin sensor ECU 21A are set to be smaller in order as described (that is, priority is higher in the order described). In this embodiment, the fixed ID of the proximal phalanx skin sensor ECU 17A is set to "0010", the fixed ID of the middle phalanx skin sensor ECU 19A is set to "0001", and the fixed ID of the fingertip skin sensor ECU 21A is set to "0000".

Next, the configuration of the instruction signal and the operation of the slave nodes 17, 19 and 21 when the instruction signal is received will be described. FIG. 4 shows the configuration of the instruction signal. The instruction signal is composed of one packet. The instruction signal includes a header portion (not shown) and a data portion. The header portion includes data indicating that the instruction signal is a signal instructing the change of the change ID. The data portion contains 8-byte data, that is, 64-bit data.

The slave nodes 17, 19 and 21 that have received the instruction signal each divide the data portion into 4 bits and extract a set corresponding to the fixed ID. To be specific, the slave nodes 17, 19, and 21 receiving the instruction signal calculate a start number by multiplying a numerical value acquired by converting its own fixed ID into a decimal number by four and adding one, and extract a set of 4-bit data from the fifth bit from the beginning. For example, the middle phalanx skin sensor node 19 calculates the start number as 4×1+1=5 because the fixed ID is "0001", and extracts a set of data for 4 bits starting from the 5th bit from the beginning part. After that, the slave nodes 17, 19 and 21 set the extracted data set as the change ID. As a result, the change ID is changed to the data included in the instruction signal.

When the communication system 1 is driven, the master node 23 repeats the master side processing while the communication system 1 is being driven, and continuously performs the processing. The details of the master side processing will be described below.

Figure 5:
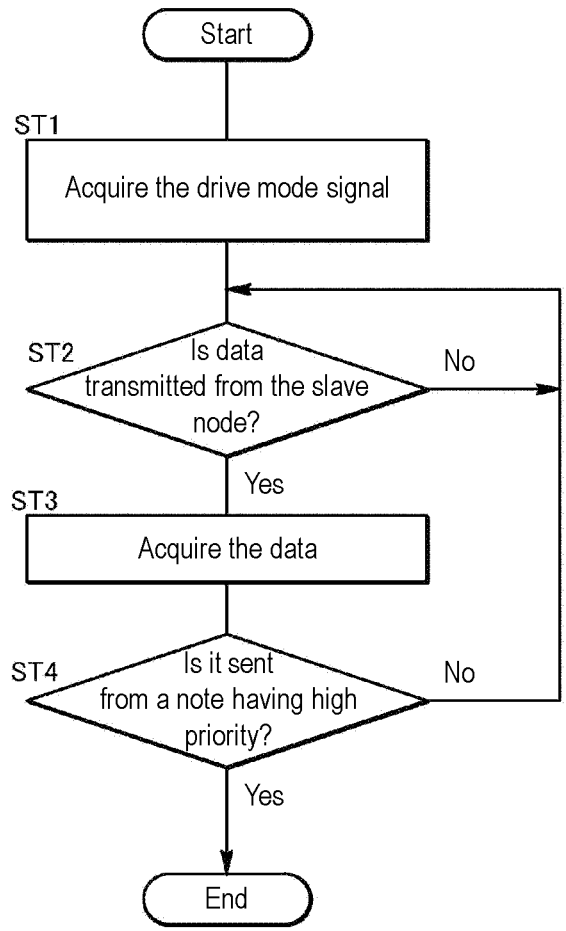
FIG. 5 is a flowchart of processing on a master side.

FIG. 5 shows a flowchart of processing on the master side. In the first step ST1 of the master side processing, the master node 23 first acquires the drive mode signal from the control device 13. After that, based on the drive mode signal, the master node 23 transmits an instruction signal to each of the frames transmitted from the slave nodes 17, 19 and 21 so as to set the priority suitable for the drive mode.

For example, when the drive mode is the sphere gripping mode, the master node 23 sets an instruction signal at predetermined time intervals (for example, every second) such that the priority of the frames transmitted from each of the fingertip skin sensor node 21, the middle phalanx skin sensor node 19, and the proximal phalanx skin sensor node 17 is smoothed. For example, the master node 23 may be set such that the priority of the frames transmitted from each of the fingertip skin sensor node 21, the middle phalanx skin sensor node 19, and the proximal phalanx skin sensor node 17 is changed in order each time the step ST1 is executed. That is, the master node 23 may be configured to set the change ID of the frame transmitted from the fingertip skin sensor node 21 before the execution of ST1 to the change ID of the proximal phalanx skin sensor node 17, set the change ID of the frame transmitted from the middle phalanx skin sensor node 19 before the execution of ST1 to the change ID of the fingertip skin sensor node 21, and set the change ID of the frame transmitted from the proximal phalanx skin sensor node 17 before the execution of ST1 to the change ID of the middle phalanx skin sensor node 19, respectively, each time step ST1 is executed.

For example, when the drive mode is the disk gripping mode, the master node 23 is set such that the priority of the frame transmitted from the fingertip skin sensor node 21 is higher than the priority of the frame transmitted from the middle phalanx skin sensor node 19, and that that the priority of the frame transmitted from the middle phalanx skin sensor node 19 is higher than the priority of the frame transmitted from the proximal phalanx skin sensor node 17. In this embodiment, the master node 23 transmits to the bus 15 an instruction signal in which the data in the data portion is 0000000010010 . . . in the order from the beginning part.

When the transmission is completed, the master node 23 executes step ST2. The bus 15 is monitored, and it is waited until data is transmitted from the slave nodes 17, 19 and 21. When it is detected that the transmission of data has started, the master node 23 executes step ST3.

In step ST3, the master node 23 starts acquiring the data from the bus 15. When the acquisition of data is completed, the master node 23 executes step ST4.

In step ST4, the master node 23 determines whether the data acquired in step ST3 is the data transmitted from the slave nodes 17, 19, 21 set to transmit the frame having high priority. When it is the data transmitted from slave nodes 17, 19, 21 set to transmit the frame having high priority, the master node 23 finishes the processing on the master side, and if not, executes step ST2.

When the communication system 1 is driven, the slave nodes 17, 19 and 21 acquire data from the corresponding sensors, and when the acquisition is completed, transmit the frame including the data acquired by the sensors in the data area to the bus.

However, the slave nodes 17, 19 and 21 constantly monitor whether or not the instruction signal is transmitted from the master node 23 by acquiring the signal level of the bus 15. When the instruction signal is transmitted, the slave nodes 17, 19 and 21 acquire the instruction signal and change the change ID based on the acquired instruction signal.

Next, the operation and effect of the communication system 1 will be described.

Since the instruction signal is not transmitted to the bus 15 during the period from the activation of the communication system 1 to the acquisition of the drive mode signal by the master node 23, in this embodiment, the slave nodes 17, 19, and 21 each set the change ID to "0000". As a result, among the slave nodes 17, 19 and 21, the node having the smallest fixed ID, that is, the frame transmitted from the fingertip skin sensor node 21, is prioritized. As described above, even if the change ID is the same, the fixed ID is different, so the communication arbitration of the frame is properly performed.

When the master node 23 acquires the drive mode signal (step ST1), the master node 23 transmits an instruction signal to the bus 15. As a result, the change ID of the frame transmitted from the slave nodes 17, 19 and 21 is changed, and priority is given to each of the frames transmitted from the slave nodes 17, 19 and 21 so as to match the drive mode.

Figure 6:
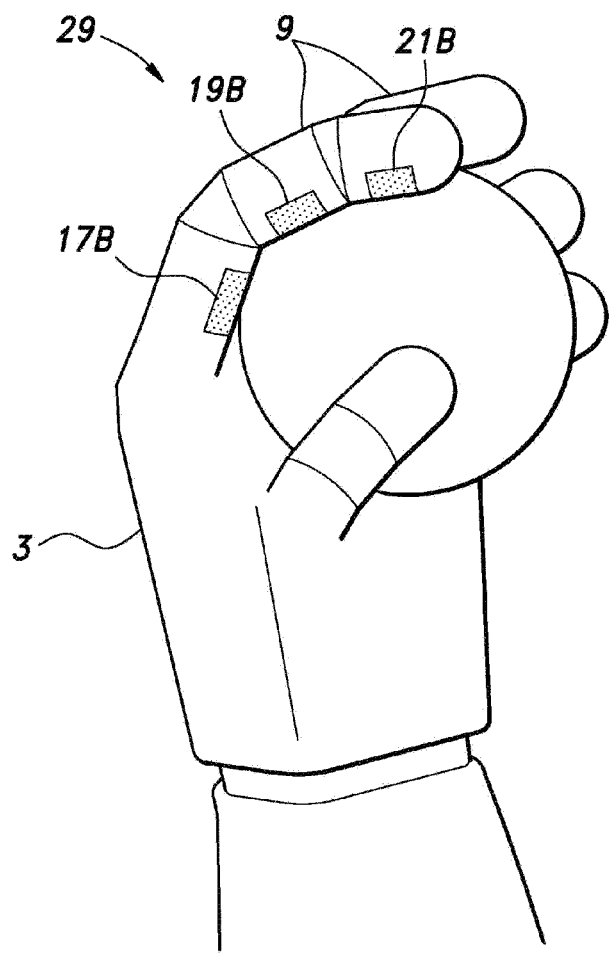
FIG. 6 is a perspective diagram of a robot hand when driven in a sphere gripping mode.

As shown in FIG. 6, when the drive mode is the sphere gripping mode, it is expected that the portions corresponding to the proximal phalanx, the middle phalanx, and the fingertip of the finger portion 9 all come into contact with the ball (sphere). Therefore, it is preferable that the master node 23 acquires all the data of the proximal phalanx skin sensor 17B, the middle phalanx skin sensor 19B, and the fingertip skin sensor 21B at the same frequency and outputs the same to the control device 13.

When the drive mode is the sphere gripping mode, the master node 23 transmits an instruction signal and change the change ID in order every time data transmitted from the slave nodes 17, 19 and 21 having high priority is acquired. As a result, since the priority of the frame transmitted from the slave nodes 17, 19, 21 may be smoothed across all the slave nodes 17, 19, 21, the data of the corresponding sensor may be acquired from all the slave nodes 17, 19 and 21 at the same frequency.

Figure 7:
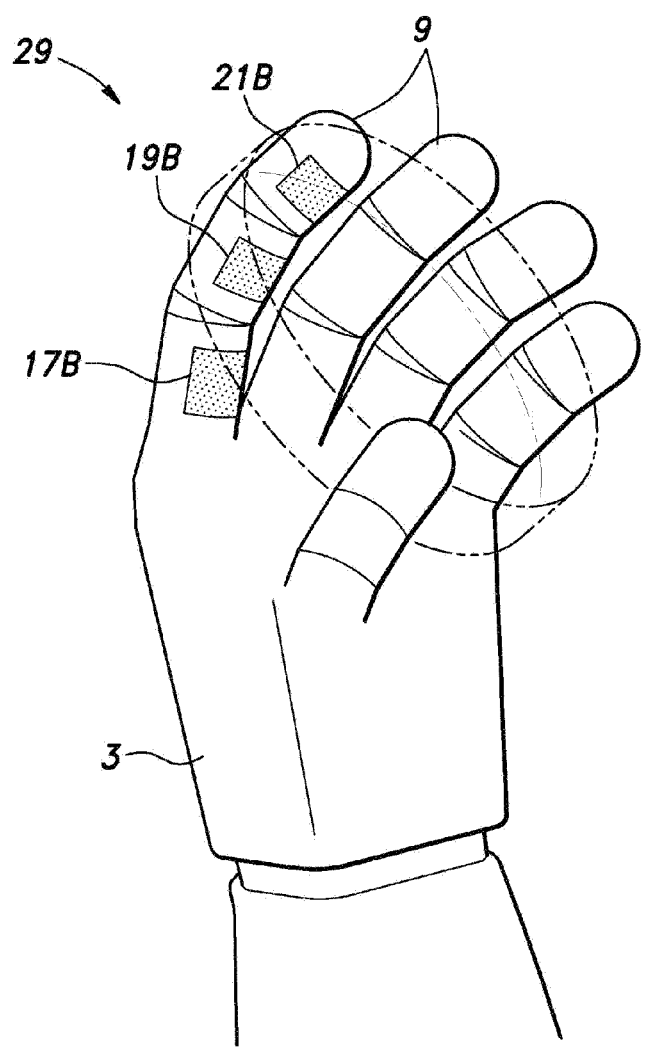
FIG. 7 is a perspective diagram of a robot hand when driven in a disk gripping mode.

As shown in FIG. 7, when the drive mode is the disk gripping mode, it is expected that the portion of the finger portion 9 corresponding to the fingertip comes into contact with the disk (see the two-dot chain line in FIG. 7). Therefore, it is preferable that the master node 23 gives priority to data acquisition data from the fingertip skin sensor 21B and outputs the data to the control device 13.

In the disclosure, when the drive mode is the disk gripping mode, according to the instruction signal transmitted by the master node 23, the priority of the frame transmitted from the proximal phalanx skin sensor node 17, the priority of the frame transmitted from the middle phalanx skin sensor node 19, and the priority of the frame transmitted from the fingertip skin sensor node 21 are set to be higher in the order described. As a result, the frame transmitted from the proximal phalanx skin sensor node 17 is acquired with priority by the master node 23, such that priority can be given to data acquisition from the fingertip skin sensor 21B.

When the drive mode is changed and the master node 23 is transmitting the instruction signal, since the beginning part of the frame transmitted by the master node 23 is 0, the frames transmitted from the slave nodes 17, 19 and 21 fail the communication arbitration, and the slave nodes 17, 19 and 21 stop the transmission of the frames. Therefore, the other slave nodes 17, 19, and 21 can accurately acquire the instruction signal from the master node 23.

When the slave nodes 17, 19 and 21 acquire the instruction signal, the slave nodes 17, 19 and 21 change the change ID and transmit the frame according to the instruction signal. In the frame ID, since the change ID is provided after the type ID and before the fixed ID, the priority of the frames transmitted from each of the slave nodes 17, 19 and 21 may be changed. Therefore, without changing the priority of the master node 23, the priority of the slave nodes 17, 19, and 21 transmitting the signal acquired by the sensor can be selectively changed, so the data can be acquired by a sensor suitable for the drive mode.

In this way, when the object to be gripped (disk, sphere) is determined and the drive mode is set by the change of usage status, the master node 23 transmits an instruction signal to give priority to a frame from a sensor that acquires information related to a surface predicted to come into contact with the object to be gripped. As a result, the frame by the sensor predicted to come into contact is prioritized, so priority can be given to acquiring data suitable for the usage situation. Thus, it is predicted that the object to be gripped can be gripped more stably.

This concludes the description of the specific embodiment, but the disclosure is not limited to the above-described embodiment or modification, and may be widely modified. In the above embodiment, the hand sensor ECU 23A (master node 23) and the microcomputer separate from the control device 13 are configured, but the disclosure is not limited to this embodiment. The hand sensor ECU 23A and the control device 13 may be configured by an integrated computer, and the hand sensor ECU 23A may be configured by the control device 13.

In the above embodiment, the master node 23 is configured to acquire the drive mode signal and transmit the instruction signal in step ST1, and then execute step ST2, but the disclosure is not limited to this embodiment. The master node 23 may be configured to execute step ST2 without transmitting an instruction signal when a predetermined amount of time elapses when the drive mode signal cannot be obtained in step ST1. At this time, the master node 23 may store the fingertip skin sensor node 21 as a node having high priority. As a result, after the communication system 1 is activated and a predetermined amount of time has elapsed without the master node 23 acquiring the drive mode signal, the master node 23 may acquire data from the slave nodes 17, 19, and 21. However, at this time, since the frame from the fingertip skin sensor node 21 having the smallest fixed ID is prioritized, the master node 23 is acquires the signal of the fingertip skin sensor node 21.

In the above embodiment, the slave nodes 17, 19 and 21 are configured to set the change ID to "0000", respectively, during the period from the start of driving of the communication system 1 to the reception of the instruction signal from the master node 23, the disclosure not limited to this aspect. For example, the slave nodes 17, 19, and 21 may each set the change ID to a predetermined value during the period from the start of driving of the communication system 1 to the reception of the instruction signal from the master node 23. By adjusting the predetermined value, it is possible to determine the priority of the frames transmitted from the slave nodes 17, 19 and 21 during the period from the start of driving of the communication system 1 to the reception of the instruction signal from the master node 23.

In addition, a flag (such as 11111111 or the like) indicating the end of the instruction signal may be provided at the end of the instruction signal.

In addition, the specific configuration, arrangement, quantity, angle, material, and the like of each member and portion may be appropriately changed as long as they do not deviate from the gist of the disclosure. On the other hand, not all of the components shown in the above embodiments are indispensable, and they may be appropriately selected.

According to this aspect, when the node corresponding to the master transmits the instruction signal, the node corresponding to the slave stops the transmission of the frame. Therefore, the node corresponding to the slave may acquire the instruction signal. When the node corresponding to the slave acquires the instruction signal, the change ID included in the frame is changed according to the instruction signal. As a result, the frame ID of the frame transmitted from the node corresponding to the slave is changed, such that the priority can be changed.

In the above aspect, it is preferable that the type ID, the change ID, and the fixed ID are provided in the frame in order as described.

According to this aspect, when a frame is transmitted from the node corresponding to the master, the node corresponding to the slave first receives the type ID. Therefore, when the frame is transmitted from the node corresponding to the master, the transmission of the frame from the node corresponding to the slave may be stopped. Further, since the node corresponding to the slave receives the change ID and the fixed ID in this order, the priority order can be changed regardless of the fixed ID by changing the change ID.

In the above embodiment, it is preferable that the node that is the master smooths the priority of the frame transmitted from the node that is the slave by transmitting the instruction signal at predetermined time intervals.

According to this aspect, it is possible to suppress the bias of the node for acquiring data by a simple method.

In the above aspect, it is preferable that the node that is the master transmits the instruction signal in response to a change in usage status.

According to this aspect, priority can be given to acquiring data suitable for the usage situation.

According to this aspect, the detection result can be acquired in priority from the sensor that acquires the information of a portion predicted to come into contact at gripping.

EFFECTS

According to the above aspects, it is possible to provide a communication system in which communication arbitration can be performed based on the priority of frames and the node to which transmission data should be prioritized is changeable.

What is claimed is:

1. A communication system,
comprising a plurality of nodes, each of which connected via a bus and transmitting to the bus a frame comprising a frame ID indicating a priority order, and when two or more of the nodes transmit the frame at the same time, performing, among the nodes starting transmission at the same time, communication arbitration by stopping transmission of the frame except for the node transmitting the frame having a highest priority,
wherein the frame ID comprises a type ID indicating a type of the node that is a transmission source, a change ID changeable by the node that is the transmission source, and a fixed ID specific to the node that is the transmission source, wherein the type ID, the change ID, and the fixed ID are provided in the frame in order as described;
the type comprises a master and slaves;
when the type ID is the master, a priority of the frame is set higher than when the type ID is the slave;
the node that is the master is capable of transmitting to the bus an instruction signal instructing the node that is the slave to change the change ID; and
when the node that is the slave receives the instruction signal, the change ID comprised in the frame is changed according to the instruction signal.

2. The communication system according to claim 1, wherein the node that is the master smooths the priority of the frame transmitted from the node that is the slave by transmitting the instruction signal at predetermined time intervals.

3. The communication system according to any one of claim 1, wherein the node that is the master transmits the instruction signal in response to a change in usage status.

4. The communication system according to any one of claim 2, wherein the node that is the master transmits the instruction signal in response to a change in usage status.

5. A gripping system, comprising:
the communication system according to claim 2 and a robot hand capable of gripping an object;
wherein each of the nodes that is the slave is connected to a sensor that acquires information related to contact with a surface of the robot hand; and
when an object to be gripped of the robot hand is determined and a usage status of the robot hand is changed, the node that is the master transmits the instruction signal to give priority to the frame from the sensor that acquires the information related to the surface predicted to come into contact with the object to be gripped.

* * * * *